US011977573B2

(12) United States Patent
Sanghvi et al.

(10) Patent No.: US 11,977,573 B2
(45) Date of Patent: May 7, 2024

(54) AUTOMATED TAGGING OF TOPICS IN DOCUMENTS

(71) Applicant: Apple Inc., Cupertino, CA (US)

(72) Inventors: Nirali K. Sanghvi, Sherman Oaks, CA (US); Andrew C. Cofano, Los Angeles, CA (US); Connor R. Batch, Los Angeles, CA (US); Kenneth Samuel, Los Angeles, CA (US); Veerandhar Veluvolu, San Ramon, CA (US); Vlad Costin Pirvu, Mission Viejo, CA (US); Nikita Dubnov, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/558,374

(22) Filed: Dec. 21, 2021

(65) Prior Publication Data
US 2023/0195771 A1 Jun. 22, 2023

(51) Int. Cl.
*G06F 16/35* (2019.01)
*G06F 16/38* (2019.01)
*G06F 40/166* (2020.01)
*G06F 40/279* (2020.01)

(52) U.S. Cl.
CPC ............ *G06F 16/353* (2019.01); *G06F 16/38* (2019.01); *G06F 40/166* (2020.01); *G06F 40/279* (2020.01)

(58) Field of Classification Search
CPC ...... G06F 16/353; G06F 16/38; G06F 40/166; G06F 40/279
See application file for complete search history.

(56) References Cited

U.S. PATENT DOCUMENTS 8,589,433 B2 * 11/2013 Gawor .................. G06F 16/353
706/14
9,449,080 B1 * 9/2016 Zhang ................ G06F 16/3346
(Continued)

FOREIGN PATENT DOCUMENTS

CN 108268575 A * 7/2018 ........... G06F 16/353

OTHER PUBLICATIONS

Njagi et al. "A Lexicon-based Approach for Hate Speech Detection", 2015, International Journal of Multimedia and Ubiquitous Engineering, pp. 217-228. (Year: 2015).*

*Primary Examiner* — Matthew J Ellis
(74) *Attorney, Agent, or Firm* — Kilpatrick Townsend & Stockton LLP (57) ABSTRACT

Techniques are disclosed for automatic tagging of terms within a document and generating visual representations specifying the identifications to terms in the document and tags assigned to each term. Particularly, responsive to obtaining a document, a term auto-tagging system can implement machine learning and/or natural language processing techniques to compare terms included in the document with a database maintaining a mapping of terms and tags corresponding to each term to assign one or more tags to relevant terms. The identified terms and tags can be provided in a visual representation for processing/review at a client device, and the visual representation can be modified according to actions selected for the identified terms. The modified visual representation can be provided to a client device, and metadata for each term/tag can be uploaded to a database for training the term auto-tagging system.

19 Claims, 8 Drawing Sheets

(56) References Cited

U.S. PATENT DOCUMENTS

| | | | | |
|---|---|---|---|---|
| 2004/0123233 A1* | 6/2004 | Cleary | ............... | G06F 40/143 |
| | | | | 715/260 |
| 2011/0313757 A1* | 12/2011 | Hoover | ............... | G06F 40/205 |
| | | | | 704/9 |
| 2014/0180788 A1* | 6/2014 | George | ............... | G06Q 50/01 |
| | | | | 705/14.72 |
| 2014/0200893 A1* | 7/2014 | Vanjani | ............. | H04N 21/4532 |
| | | | | 704/257 |
| 2017/0300472 A1* | 10/2017 | Parikh | ............... | G06F 40/205 |
| 2019/0278751 A1* | 9/2019 | Ko | ............... | G06Q 50/01 |
| 2019/0303796 A1* | 10/2019 | Balasubramanian | .. | G06N 7/005 |
| 2021/0034816 A1* | 2/2021 | Lall | ............... | G06N 5/003 |

* cited by examiner

AUTOMATED TAGGING OF TOPICS IN DOCUMENTS

BACKGROUND

An electronic document can include a plurality of text lines providing detailed text content. For example, a document can include text detailing aspects of media content (e.g., a movie, television show, audio content). Another example of a document can include a scholarly article with text providing details relating to research performed by one or more individuals.

In many instances, text included in the document can be processed to identify various aspects of the document. For example, terms within a document can be identified for various reasons, such as to identify misspelled words. Processing the document to identify terms relating to various classes of terms can increase efficacy in reviewing the document or modifying one or more aspects of the document.

BRIEF SUMMARY

Embodiments of the present disclosure can provide methods, systems, and computer-readable media for performing a term auto-tagging process for terms in a document. In some examples, a term auto-tagging system can process a document to associate terms in a document with various tags and provide an identification of the identified terms and associated tags to a client device.

According to one embodiment, a method may be executed by a term auto-tagging system. The term auto-tagging system can comprise one or more computing instances implementing a database and a machine learning (ML)/natural language processing (NLP) pipeline to perform a term auto-tagging process.

The term auto-tagging system can obtain a document and identify a series of text portions (e.g., text lines) in the document. Each of the series of text portions can be processed to identify a first set of terms in the document associated with a first tag by comparing each of the series of text portions with a database mapping terms with a plurality of tags. Each tag can uniquely specify a class of terms. Each of the first set of terms can be associated with a first tag. Further, a second set of terms in the document associated with any of the plurality of tags maintained at the database using metadata maintained at the database, each of the second set of terms can be associated with corresponding tags.

A first display can be provided to the client device. The first display can identify each of the first set of terms and the second set of terms, each tag corresponding with each of the first set of terms and the second set of terms, and one or more actions for each of the identified terms. For instance, the first display of the document can be provided to the client device for review and/or selecting actions provided for each identified term.

Responsive to obtaining selections of the one or more actions for any of the identified terms, a second display can be generated that modifies the first display according to the obtained selections of the one or more actions for any of the identified terms. For instance, responsive to detecting a selection of an action to remove an identified term, the identification of the term can be removed in the second display. The term auto-tagging system can provide the second display to the client device for subsequent processing/review.

The term auto-tagging system can provide metadata for each identified term to the database. The metadata can include any of the term, the one or more tags associated with the term, text for the text portion corresponding with the term, and an indication of any selection of any action for the term. The metadata can be used in training the term auto-tagging system in associating terms with one or more tags.

DETAILED DESCRIPTION

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

The following examples are provided to introduce certain embodiments. In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

The present embodiments relate to automatic tagging of terms within a document and generating visual overlays configured to identify terms in the document and tags assigned to each term. Particularly, a term auto-tagging system can receive a document and process it to translate the document into a machine-readable format (e.g., a HTML, format). The term auto-tagging system can also compare terms included in the document with a database maintaining a mapping of terms and tags (e.g., corresponding to each term) to identify relevant terms.

As an example, the term auto-tagging system can identify terms that are expletives and/or tag those terms in the document (e.g., with a tag specifying the terms as expletives). The term auto-tagging system can identify terms in the document that correspond to any of multiple different tags or tag types and assign the tags to each identified term. The tags can be used to classify terms as relating to various types of things (e.g., violence, smoking, gambling, objects, brand-specific content, audio/visual media content, locations, etc.) The "term," as described herein, can include a word, phrase, sentence, etc. that is included in the database.

The term auto-tagging system can generate a first visual representation that identifies (e.g., highlights on a user interface (UI) of a user device) each identified term and specifies any tag(s) associated with each identified term. The first visual representation can also provide one or more actions that can be taken (e.g., by a user) with respect to each identified term/tag. For example, a user can select a user interface (UI) element associated with the tag, instructing the system to keep the term identified in the document and a second action can specify removing the identification of the term in the document. The first visual representation can identify the identified terms and provide an interface illustrating tag(s) assigned to each term and the actions that can be taken with respect to each identified term. The first visual representation can be provided to a client device for review of the identified terms and to request selection of action(s) provided in the first visual representation.

The term auto-tagging system can detect selections with respect to each identified term. For example, the selections can be provided from the client device interacting with the first visual representation. The term auto-tagging system can further modify the document based on selections for each term. For example, responsive to detecting a selection to keep a term identified in the document, the identification to the term can be included in a second visual representation. As another example, responsive to detecting a selection to remove a term identified in the document, the identification to the term can be removed and not included in the second visual representation. The second visual representation can be generated according to the obtained selections with respect to the identified terms.

In some instances, an additional term not previously identified in the document can be selected by the client. For example, responsive to providing the first visual representation, an additional term can be selected by the client at client device with one or more tags. In response, the additional term can be identified in the second visual representation with the corresponding tag(s) and the database can be updated to incorporate the additional term and the corresponding tag(s).

The second visual representation can be provided to the client device for further processing/review. The term auto-tagging process as described herein can efficiently identify terms of varying classes specific to the type of document. Further, the term auto-tagging process obtains selections for identified terms and modifying the display of the identified terms according to the selections.

Additionally, the term auto-tagging system can update the database with metadata identifying contextual features of each identified term. For instance, the metadata can include a combination of a term, tags assigned to the term, other text in the corresponding text portion (e.g., other words in the same sentence as the identified term), selection for the term, etc.

The contextual features can be used to train the term auto-training system to increase accuracy in assigning tags to the terms. For example, in some contexts, a term can include content identified as an expletive. However, in other contexts, the same term can describe an animal, for example. The metadata can distinguish contexts for a term, and the term auto-tagging system can assign tags to terms using the contexts identifiable in the metadata. The training of the term auto-tagging system using data stored in the database (e.g., metadata) can increase accuracy in associating terms with corresponding tags.

I. Auto Tagging Overview

Figure 1:
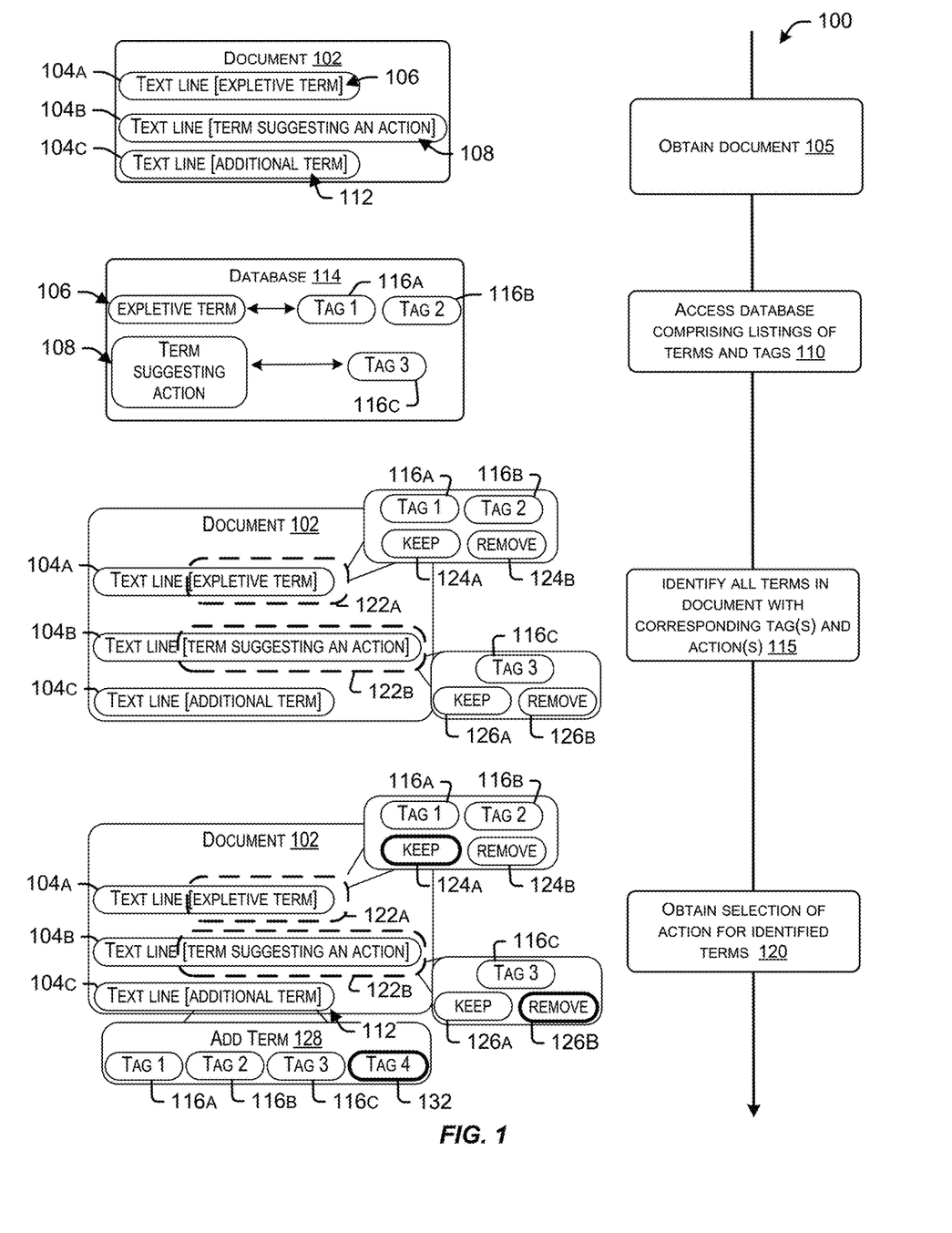
FIG. 1 is a flow diagram of an example auto-tagging process according to some embodiments.

As described above, a document can be processed via an auto-tagging process to identify terms and corresponding tags in the document. FIG. 1 is a flow diagram of an example auto-tagging process 100 according to some embodiments.

At 105, a document can be obtained. A document can include an electronically-scanned document provided by a client device (e.g., via a web application connecting the client device to the term auto-tagging system). The document can be any of a variety of document types, such as a script for media content (e.g., a movie, television show, audio content), a scholarly article, a news article, an instruction manual, etc. In some instances, the document can be provided in a fixed file format (e.g., portable document format (PDF)). In such instances, upon reception of the document, the document can be translated from the fixed file format to another format, such as a machine-readable format (e.g., hypertext mark-up language (HTML)), for example. The document can be in a markup format, allowing for modifications (e.g., marking up) of the document during the auto-tagging process.

As shown in FIG. 1, a document 102 can include multiple text lines 104A-C. A term auto-tagging system can process the document to identify each text line 104A-C (or "text portion") in the document. For example, a first text line 104A can include a text portion (e.g., a sentence, a paragraph) that provides content (e.g., describing a paragraph in a news article). Further, the text line 104A can include a term to be identified (e.g., an expletive term 106). For instance, an expletive term 106 can include any term (e.g., word, phrase) identified as containing crude or sensitive content for any group of individuals. The expletive term 106 can be tagged with one or more corresponding tags identifying the term 106 as comprising expletive content. As described in greater detail below, a database (e.g., 114) can maintain a listing of terms, tags associated with the terms, and metadata providing contextual features for training the term auto-tagging system in associating terms with one or more tags.

As another example, a second text line 104B can include a text portion that includes a term suggesting an action 108. For instance, a term suggesting an action 108 can describe an action being taken. As an example, a term suggesting an action 108 can describe an individual running, kicking, speaking, etc. As described in greater detail below, terms relating to various actions (e.g., smoking, gambling, performing a violent action) can be associated with one or more tags. Example tags can relate to violence, smoking, gambling, objects, audio/video content, content associated with brands, etc.

Further, in this example, a third text line 104C can include any additional term 112. In this example, additional term 112 can comprise any term not previously included in the database. As described below, the additional term 112 can be selected to be added to the database with one or more associated tags.

At 110, a database 114 can be accessed. Database 114 can include a repository of terms, tags, and associated metadata. For example, an expletive term 106 can be associated with multiple tags (e.g., tag 1 116A, tag 2 116B). As another example, a term suggesting a specific action 108 (e.g., a violent action) can be associated with a third tag 116C. The term auto-tagging system as described herein can interact with database 114 to implement an auto-tagging process as described herein.

Further, database 114 can include metadata associated with each term or tag that provides contextual features for the term or tag. For instance, responsive to a term corresponding with an entry in database 114, the term can be identified in the document with one or more tags and corresponding actions (e.g., to accept the identification of the term, to reject the identification of the term). Responsive to detecting a selection for the term, the corresponding metadata (e.g., the term, tag, other text in the corresponding text portion, and the action taken with the term) can be uploaded to the database for further training of the term auto-tagging system.

At 115, an auto-tagging process can be initiated by identifying all terms in the document with corresponding tags and selections for each term. For example, the auto-tagging process can include extracting each text portion (or text line) in the document 102. Text within each text portion can then be compared with the terms in the database 114 to identify terms included in the database.

In a first example, for each text portion, every term corresponding with one or more tags in the database can be identified. In another example, each text portion can first be compared with a listing of terms associated with a first tag (e.g., terms tagged as comprising expletive content) to identify all terms in the document corresponding with the first tag. The text portions can then be processed to identify terms corresponding with the other terms in the database.

In the example as shown in FIG. 1, the first text line 104A can include an expletive term (e.g., 106). The auto-tagging process can include comparing the first text line 104A with terms listed in the database 114 to identify the expletive term 106 as matching a term in the database. Responsive to the matching of the expletive term, one or more tags (e.g., tag 1 116A, tag 2 116B) can be associated with the expletive term 106 in the first text line 104A.

Similarly, a second text line 104B can be processed to identify a term suggesting an action (e.g., smoking) can be identified as matching a term in the database 114. A third tag 116C (e.g., tagging terms relating to smoking products) can be associated with the term suggesting the action.

Responsive to identifying all terms in the document, information identifying each identified term, tag(s) corresponding with each term, and a number of actions capable of being taken can be identified for each term. For example, the document can be modified (e.g., in document 102) to highlight or otherwise identify (e.g., bold, underline) each identified term (e.g., highlights 122A-B). In another example, the identifications (122A-B) can be displayed over the document as part of the modified document.

Further, in this example, for the first identified term (e.g., identified term 122A), an interface can specify each identified tag (e.g., tag 1 116A, tag 2 116B) for the term. Each tag (e.g., 116A, 116B) can specify a type of content that the term may be related. Further, the interface can include actions 124A-B for the first identified term (e.g., identified term 122A). A first example action 124A can include a selectable interface (e.g., a button) to keep the identification to the identified term. Another example action 124B can include an interface to remove the highlight to the identified term. Other actions can be added, such as an action to replace the term with a recommended term, for example. Similarly, in the example as illustrated in FIG. 1, the modified document 102 can include an overlay of the tag (e.g., tag 3 116C) and actions (e.g., 126A-B) for the identified term 122B.

At 120, selections for each of the identified terms can be obtained. For instance, the client, via a client device, can view and interact with the document 102 (e.g., via a web application) to provide selections to the actions (e.g., 124A-B) for each term.

For example, the client, via a client device, can select a first action 124A for a first text line 1104A indicating a selection to keep the expletive term 122A highlighted in the document 118. The client may select the action to keep the expletive term to keep the highlight to the term in the document. In some instances, responsive to the selection, all other instances of that term can be modified similarly.

Further, in this example, a second selection 126B to remove a second highlighted term 122B can be detected. For example, while the term suggesting an action (e.g., smoke) can be initially tagged with a tag 116C (e.g., tag with content relating to smoking), the selection of an action (e.g., selection to remove 126B) can be indicative of a context for that term. For example, while the term "smoke" can be detected, it may not relate to an individual smoking a product. Rather, the context can specify that "smoking" relates to another subject, such as preparation of food or smoke from a fire, for example. The combination of the term, tag, selection of an action, and the other text in the text portion can be combined as metadata and uploaded to the database as tag metadata for the term.

In some instances, as shown in FIG. 1, the modified document 118 can include an interface 128 selecting a term (e.g., additional term 112) and a tag (e.g., tag 4 132) for the tag. For example, the client, via client device, can select a term (e.g., additional term 112) not previously included in the database to be added to the database with one or more identified tags. Responsive to the addition of the term, the term and tag can be added to tag metadata in the database 114.

Responsive to obtaining the selection(s) for the terms, information for the selections can be presented to the client, via client device. For example, a modified document can be provided tithe client device specifying all terms highlighted in the document 118. Further, in some instances, only the terms selected (e.g., by selecting buttons 124A, 126A) as to remain highlighted in the document. In some embodiments, a report can be generated specifying all terms identified in the document, tags associated with the terms, and selections for the terms. The modified document 118 and/or a report specifying all identified terms/tags can be provided to the client device for further review/processing.

II. System Overview

Figure 2:
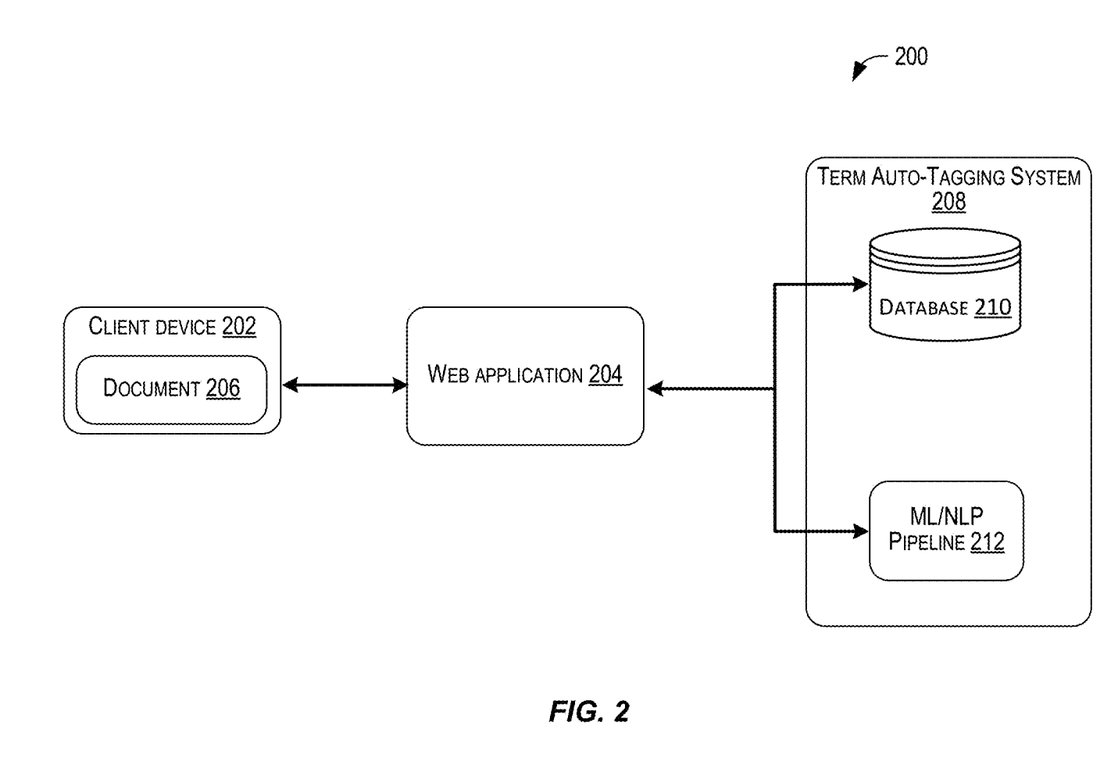
FIG. 2 is a block diagram of an example system for implementing an auto-tagging process according to some embodiments.

As described above, a document can be processed to automatically tag terms in the document via a term auto-tagging process. FIG. 2 is a block diagram of an example system 200 for implementing an auto-tagging process according to some embodiments. As shown in FIG. 2, the system 200 can include any of a client device 202, a web application 204, and a term auto-tagging system 208.

A client device 202 can include an electronic device associated with a client. For example, the client device can include a computer or mobile device capable of generating a document (e.g., 206) and providing the document 206 to the term auto-tagging system 208 via a web application 204. Further, the client device 202 can view/access a document with terms identified with one or more tags (e.g., a first visual representation as described herein), provide selections to keep/remove identified terms from the document, add terms to be identified in the document, and view/access the document updated based on the selections (e.g., second visual representation as described herein).

The web application 204 can include an application connecting the client device 202 to the term auto-tagging system 208. The web application 204 can include an interface (e.g., application programming interfaces (APIs)) allowing for uploading of a document 206 and sending the document 206 to the term auto-tagging system. Further, the web application 204 can facilitate interactions between the client device 202 to the term auto-tagging system 208, such as providing a modified document (e.g., a first display, second display), and providing selections for identified terms, for example.

The term auto-tagging system 208 can include a database 210 and a machine learning (ML)/natural language processing (NLP) pipeline 212. The ML/NLP pipeline 212 can interact with the database 201 to implement the term auto-tagging process as described herein. For example, the ML/NLP pipeline 212 can extract text portions in the document 206, and compare text data with listings of terms in the database 210 to identify terms associated with one or more tags based on data stored in the database 210. The ML/NLP pipeline 212 can further generate a first visual representation identifying the identified terms, tags associated with the terms, and actions capable of being taken for each identified term. The ML/NLP pipeline 212 can identify selections (e.g., provided by the client via client device 202) and generate a second visual representation modifying the first visual representation according to the selected actions.

The ML/NLP pipeline 212 can include machine-learning techniques to implement a multi-layer classification neural network. For instance, the ML/NLP pipeline 212 can update a database with metadata providing contextual features into the terms identified as being associated with the one or more tags. The metadata can include a term, tags for each term, text in the text portion corresponding with the term, and an action taken with respect to the term. The metadata can be uploaded to the database 210 and used by the ML/NLP pipeline 212 to train itself and increase accuracy in associating terms with tags according to the contextual features included in the metadata.

The database 210 can include a lookup database (or series of interconnected database instances) that include a mapping of terms and tags. The database 210 can further store metadata providing contextual features for terms and/or tags.

In some instances, the database 210 can include multiple listings of terms associated with various tags. Further, the tags can be specified to one or more types of documents. For example, a document comprising a news article can be processed to identify terms with a first set of tags, while a document relating to a script for media content can be processed to identify terms with a second set of tags. Further, tags can be specified for a document based on a score/rating assigned to the document. For example, a score can be assigned to a document based on a nature of the content in the document, a target audience, etc. For instance, a document providing a script for a movie with a target audience below a threshold age (e.g., a children's movie) can be assigned a first rating. In this example, the first rating can specify that the document can be process for terms relating to all tags in the database. In another instance, a document providing an article with an adult-age target audience can be assigned a second rating, where the document is processed only for terms relating to a portion of the tags in the database.

Figure 3:
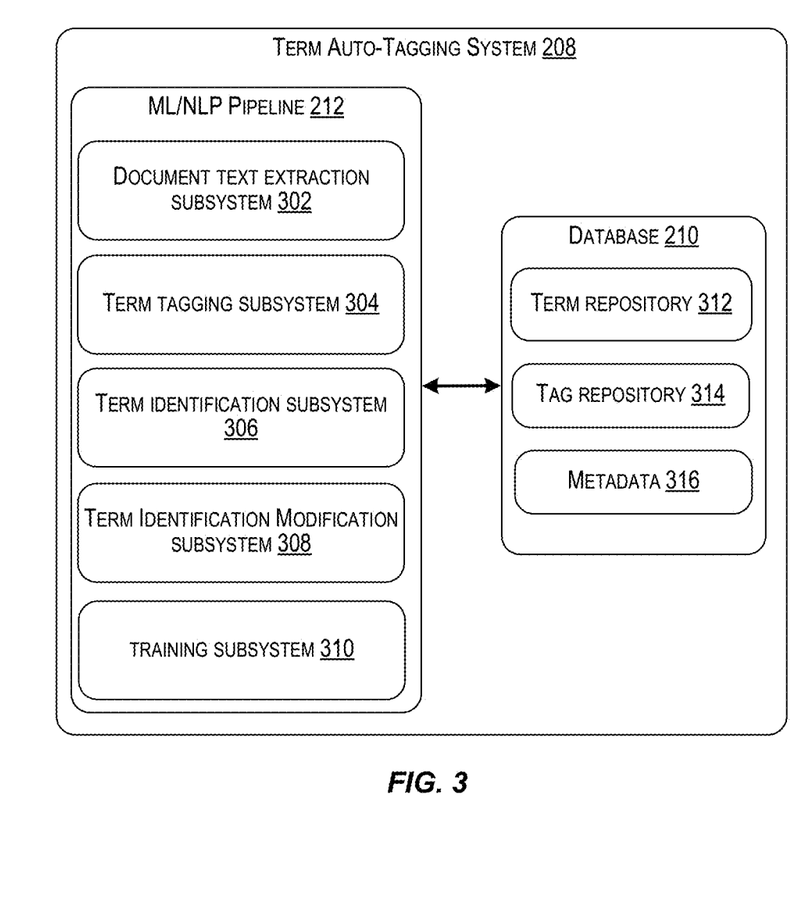
FIG. 3 provides a block diagram of an example term auto-tagging system according to some embodiments.

As described above, the term auto-tagging system can include a database and ML/NLP pipeline configured to implement a term auto-tagging process. FIG. 3 provides a block diagram of an example term auto-tagging system 208 according to some embodiments. As described above, the term auto-tagging system 208 can include a ML/NLP pipeline 212 and a database 210.

The ML/NLP pipeline 212 can include a document text extraction subsystem 302. The document text extraction subsystem 302 can process the document and identify multiple text portions and text content included in each text portion. In some instances, the document text extraction subsystem 302 can convert the document from a fixed format (e.g., PDF) to a machine readable format (e.g., HTML, Unicode) using a text conversion process (e.g., optical character recognition (OCR)). In converting the document, the document text extraction subsystem 302 can maintain a style, alignment, page numbering, etc., of the text in the document while also removing unwanted characters (e.g., special characters).

The ML/NLP pipeline 212 can also include a term tagging subsystem 304. The term tagging subsystem 304 can compare text in the document with terms listed in the database to identify terms associated with one or more tags. The term tagging subsystem 304 can further assign the one or more tags to each identified term in the document. For example, the ML/NLP pipeline 212 can identify whether a term (e.g., a word, phrase) match any entries listed in the database. The term tagging subsystem 304 can identify a term, extract words prior to and after the identified term for reference, extract a root word from the configuration, and create one or more tags to associate with the term at the document.

In some instances, the document can first be processed to identify all terms relating to a first tag (e.g., expletive content). In these instances, the document text can then be processed to identify all terms relating to any of a plurality of other tags maintained by the database.

Each text portion can be tokenized into individual portions (e.g., sentences). Each tokenized portion can be vectorized to generate a vectorized representation of each text portion in a high-dimensional vector space. The vectorized representation of each text portion can be passed to a pre-trained multi-class classification network (e.g., at the term tagging subsystem 304) to predict tags associated with each term and/or the sentence.

The ML/NLP pipeline 212 can also include a term identification subsystem 306. The term identification subsystem 306 can provide an identification of each identified term and tags associated with each term. For instance, the term identification subsystem 306 can modify the document to identify (e.g., highlight) each term in the document. The identification of each term can also include an interface illustrating tags associated with each term and actions capable of being taken for each term. This identification can include a first visual representation (or simply "display") of the document as described herein. The first display can be provided to the client device for review and interaction at the client device. Further, the client, via client device, can select actions on the first display to keep/remove term identifications, change an identified term, and/or add an additional term for identification, for example.

The ML/NLP pipeline 212 can also include a term identification modification subsystem 308. The term identification modification subsystem 308 can obtain any selections with respect to identified terms and modify the first display according to the actions taken for the terms. For example, responsive to a selection of an action to remove a highlight to a term, the highlight to that term and the corresponding interface can be removed in generation of the second display. As another example, in response to selection of an action to change a term to a recommended replacement term, the identified term can be changed to the recommended replacement term. The term identification modification subsystem 308 can generate a second visual representation (or "display") specifying the modifications to the document according to the selected actions. The second display can be provided to the client device for further processing/review.

The ML/NLP pipeline 212 can also include a training subsystem 310. The training subsystem 310 can train the ML/NLP pipeline 212 according to the identified terms, tags, and selections based on the initial tagging of terms. For example, metadata can be generated as a combination of each term, tags for each term, text in a text portion corresponding with the term, and the action selected for the term. The training subsystem 310 can process the metadata for the terms to increase accuracy in the identification of terms. For example, the ML/NLP pipeline 212 can derive contextual features from the metadata for a term/tag and assign tags to a term based on the contextual features.

The database 210 can comprise a term repository 312, a tag repository 314, and metadata 316 for terms/tags. The term repository 312 can include a listing of terms that are mapped to one or more tags stored in tag repository 314.

The tag repository 314 can provide a plurality of tags. Each tag can provide for a classification of term type. Example tags can include content relating to expletive content, objects, violent actions, smoking, gambling, brand-specific content, audio/visual content, etc. In some instances, the tags in tag repository 314 can be associated with one or more ratings. A rating can include a score assigned to various documents specifying tags to be processed for a document type. For example, a news article may be assigned a first rating and can be processed with a first set of tags, while a script for a movie can be processed using a different set of tags.

The metadata 316 can include a combination of tags/terms and contextual features for terms/tags. Metadata can be generated responsive to tagging a term with a tag and/or receiving a selection of an action for an identified term.

The ML/NLP pipeline 212 can modify an association of a term with a tag based on the contextual features in the metadata stored at database 210. As an illustrative example, a tag can comprise relating to smoking products. In this example, a first text line can include the sentence "I smoked a cigarette," and the term "smoke" can be included in a term repository and associated with the tag. Further, in this example, a second text line can include the sentence "I ate a smoked salmon sandwich," and the term "smoke" can also be included in a term repository and associated with the tag. However, the metadata 316 can provide contextual features to distinguish the context in each example text line. For instance, the metadata can tie the terms "smoke" and "cigarette" in the first text line as relating to the tag for smoking products and the association of the term "smoke" in the first text line is appropriate. However, metadata tying the terms "smoke," "salmon," and "sandwich," in the second text line can specify that the instance of "smoke" is related to foods, not smoking products, and the tagging of the term in this context may not be appropriate. The ML/NLP pipeline 212 can be trained using the metadata to identify the context in the use of terms, increasing accuracy in associating terms with one or more tags as described herein.

III. Example Term Auto-Tagging Process

As described above, a term auto-tagging system can perform a term auto-tagging process. FIGS. 4A-4D provide an example illustrations for a term auto-tagging process.

As described above, a document can be obtained by a client device. The document can be scanned to derive a series of text lines (or text portions) in the document. In some instances, the document can be converted to a machine-readable format (e.g., HMTL).

Figure 4A:
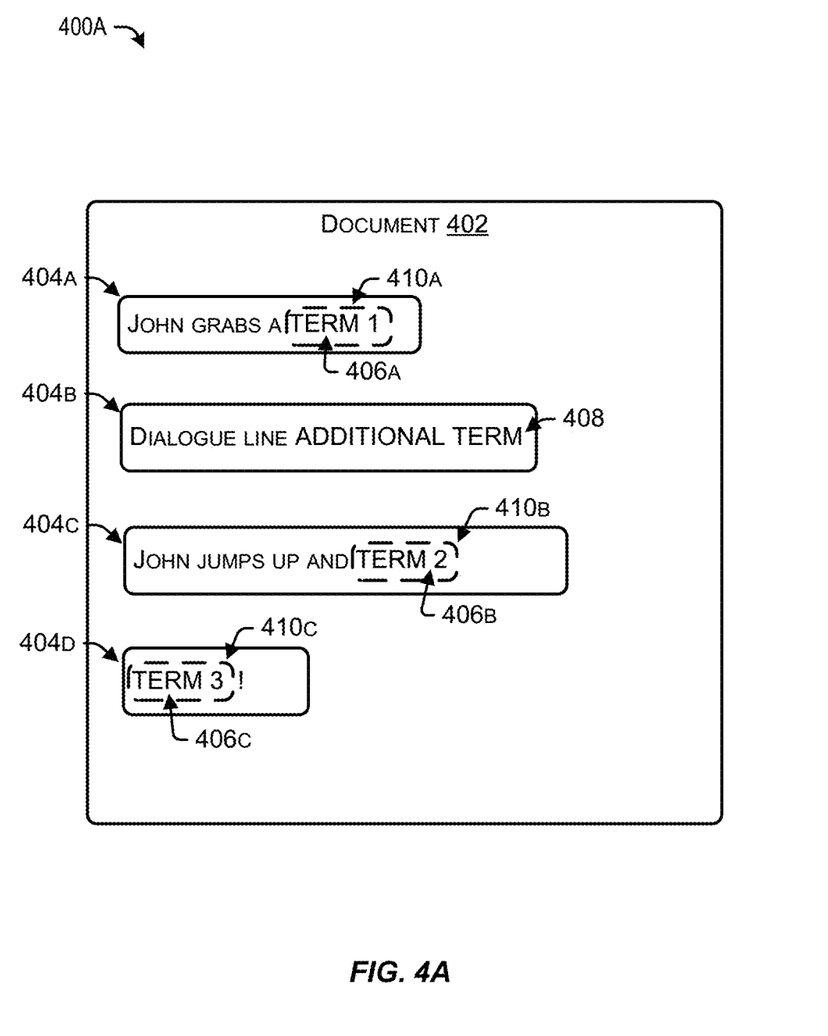
FIG. 4A is a first example illustration of a document according to some embodiments.

FIG. 4A is a first example illustration 400A of a document 402 according to some embodiments. As shown in FIG. 4A, the document 402 can include a series of text portions 404A-D. The text lines 404A-D can be processed by a term auto-tagging system as described herein to identify terms as associated with one or more tags.

For example, a first term 406A can be identified in a first text portion 404A. Additionally, a second term 406B can be identified in a third text portion 404C and a third term 406C can be identified in a fourth text portion 404D. An additional term 408 may not be included in the database, but can be subsequently identified to be added to the database with one or more tags. The term auto-tagging system can identify the terms based on a comparison between text in each text portion 404A-D and content in a database.

Further, in the example in FIG. 4A, each identified term 406A-C can be identified in the document 402. For example, the terms 406A-C can be highlighted or otherwise indicated (e.g., highlights 410A-C) on the document 402. In some instances, the identification of terms can be laid over the document 402 or provided in a report linking each term to the instance(s) of the term in the document 402.

Figure 4B:
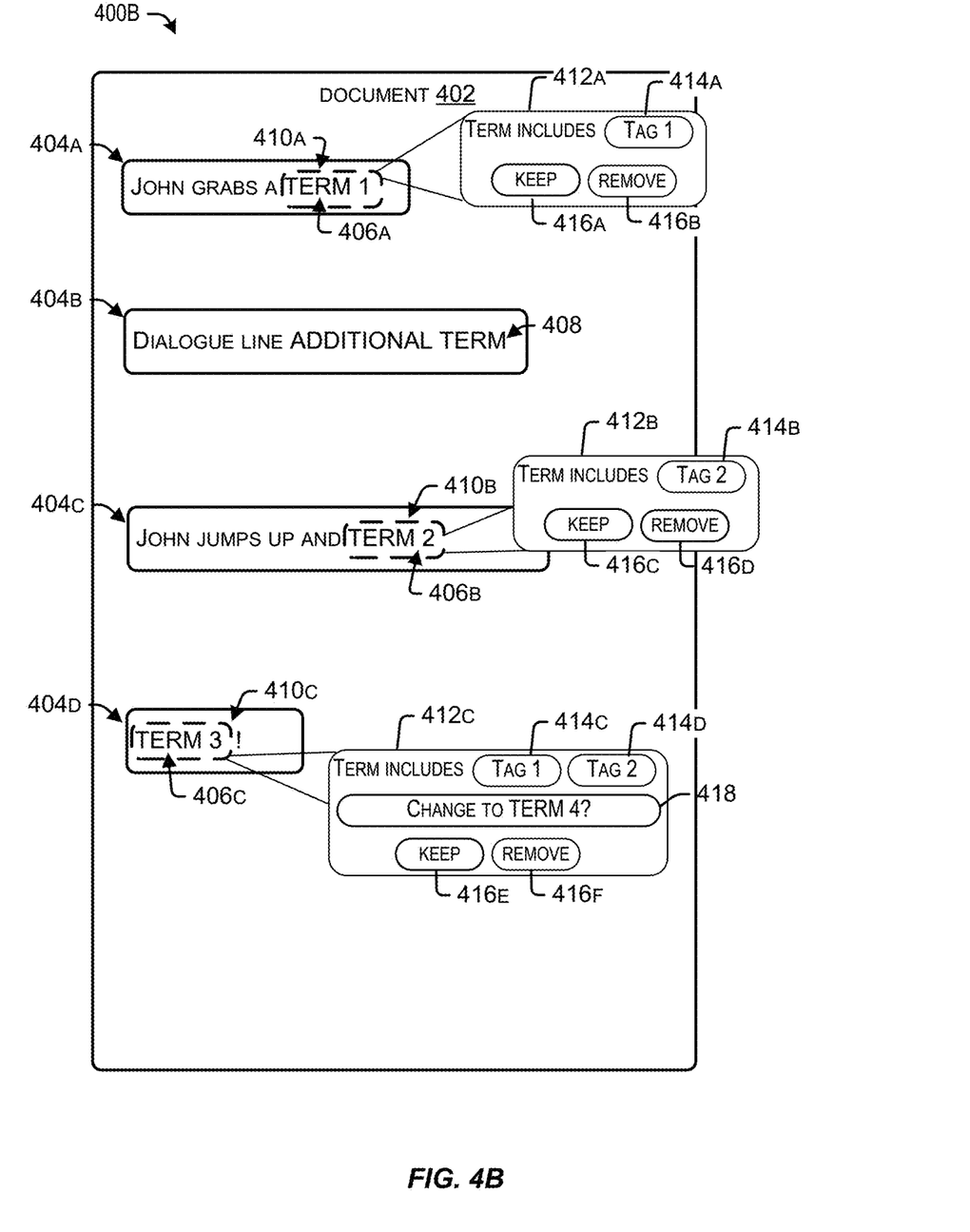
FIG. 4B is a second example illustration of a document according to some embodiments.

FIG. 4B is a second example illustration 400B of a document 402 according to some embodiments. As shown in FIG. 4B, the identification of the terms 410A-C can be provided with multiple interfaces 412A-C providing details relating to each term 406A-C. For example, for a first term 406A, an interface 412A can be added to the document 402 to specify a tag 414A and actions (e.g., 416A, 416B) capable of being taken for a term 406A. For instance, the first term 406A relates to an object and tagged with a first tag specifying terms relating to objects. A first action 416A can keep the identification (e.g., highlight 410A) to the term 406A and a second action 416B can remove the identification to the term 406A.

Further, in this example, multiple interfaces 412A-C can uniquely provide details for each identified term. In some instances, an additional action 424 can include a request to change a term with a recommended replacement term (e.g., term 4). The identifications 410A-C of terms 406A-C and interfaces 412A-C can be provided as part of a first display to the client. In some instances, the first display can comprise a report illustrating the terms, tags, and actions as described herein.

Figure 4C:
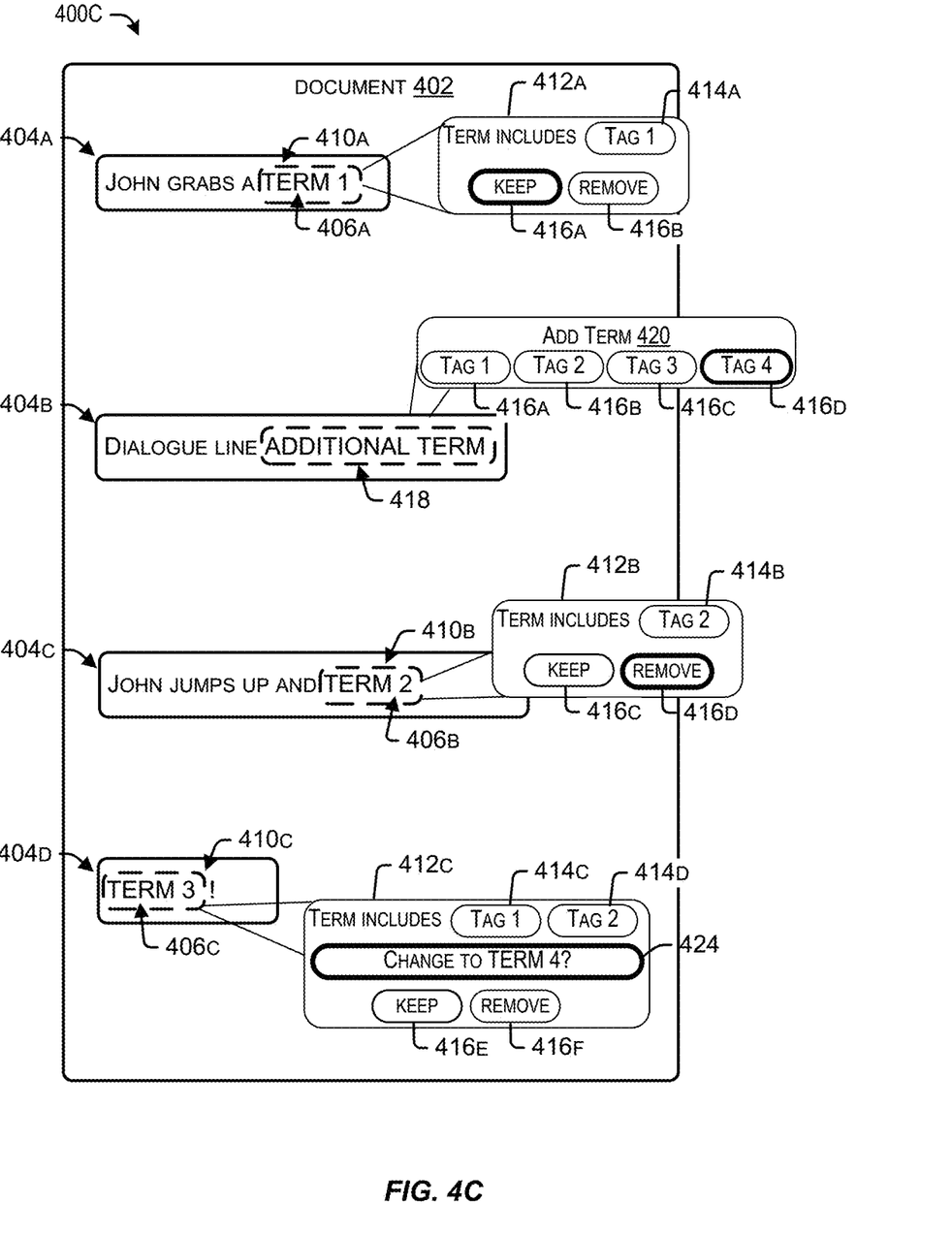
FIG. 4C provides a third example illustration of a document according to some embodiments.

As described herein, the first display of the document can be provided to a client device. In response, the term auto-tagging system can obtain a number of actions selected for each term identified in the first display. FIG. 4C provides a third example illustration 400C of a document 402 according to some embodiments. As shown in FIG. 4C, multiple selections can be provided from the client device.

For example, in a first interface 412A, a first action 416A to keep the identification 410A of the first term 406A can be identified. This can be a result of a client selecting the selectable interface (e.g., button) 416A or detecting no selection of any action for the term 406A. As another example, in a second interface 412B, an action 416D to remove the identification 410B of the second term 406B can be identified. In response, the identification 410B can be removed in a second display. Further, in this example, at a third interface 412C, an action 424 to replace the third term 406C with a new term (e.g., term 4) can be detected. In response, the third term 406C can be replaced with a fourth term.

In some instances, the client, via client device, can select a term to be identified and associated with a tag. For instance, as shown in FIG. 4C, additional term 418 can be selected as associated with a tag (e.g., 416D) in an add term interface 420. In response, the additional term 418 can be identified (e.g., highlighted) in the second display.

Figure 4D:
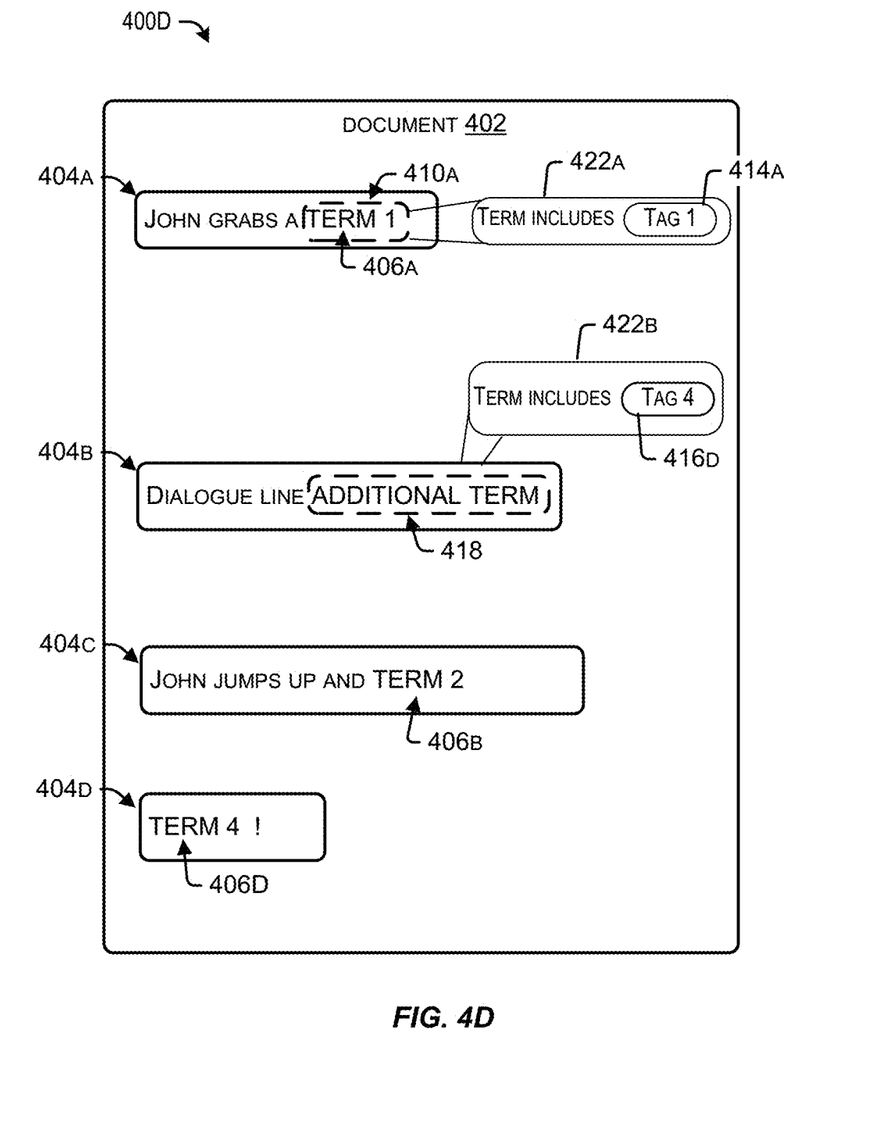
FIG. 4D provides a fourth example illustration of a document according to some embodiments.

FIG. 4D provides a fourth example illustration 400D of a document 402 according to some embodiments. As shown in FIG. 4D, the display can be modified according to the actions detected by the client. For instance, a first term 406A can be identified 410A with a new interface 422A identifying the tag 414A for the term 406A. Further, for example, an identification of a second term 406B can be removed based on a selection of an action (e.g., 416D to remove the identification 410B). Further, the additional term 418 can be identified with a new interface 422B identifying the tag 416D associated with the additional term 418. In some embodiments, the fourth line 404D can be updated to replace a third term 406C with a fourth term 406D based on the selection of an action (e.g., 424) to replace the term. The terms, tags, other text in each text line, and actions taken with each term can be combined as metadata uploaded to a database for training of the term auto-tagging system.

A second display can be generated in response to processing the actions detected for the identified terms. The second display can be provided to the client device for further processing or review at the client device. In some instances, a report of all terms identified, terms removed, terms added, etc., can be provided either as part of the second display or with the second display. The client, via client device, can modify the document according to the identification of the terms in the second display.

Figure 5:
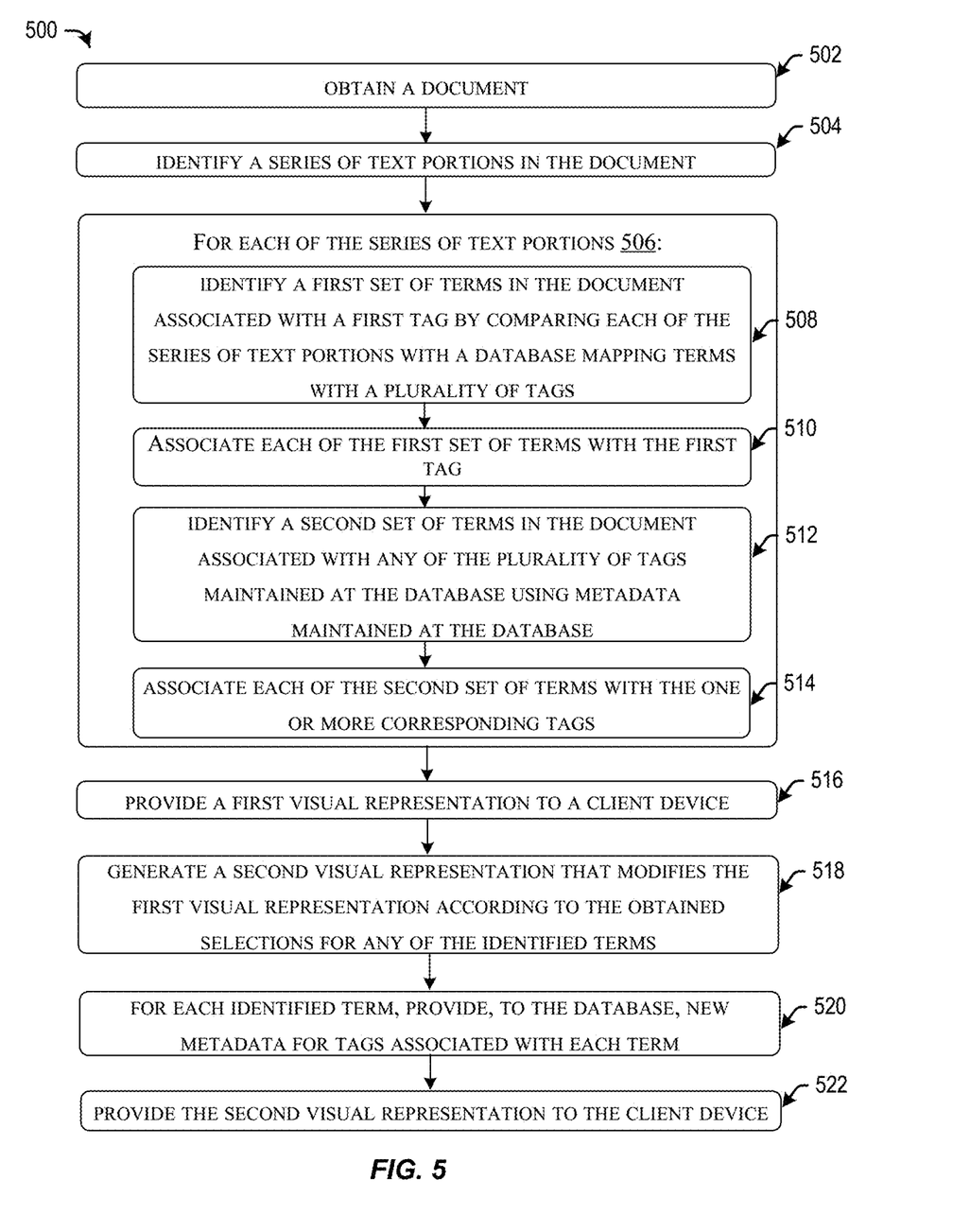
FIG. 5 provides a flow process for tagging terms in a document using a term auto-tagging process according to some embodiments

IV. Flow Process for Tagging Terms in a Document Using a Term Auto-Tagging Process FIG. 5 provides a flow process 500 for tagging terms in a document using a term auto-tagging process according to some embodiments. The tagging process as described herein can be performed by a term auto-tagging system (e.g., 208). The term auto-tagging system comprises a machine learning and natural language processing system. The term auto-tagging system can extract text portions, tag text, and provide display of the terms and tags as described herein.

At 502, the term auto-tagging system can obtain a document. The document can include an electronically-scanned document comprising one or more text portions (e.g., text lines). Example document types can include a script for media content, a news article, a scholarly article, etc. The document (e.g., document 402 in FIG. 4A) can be provided by a client device via a web application.

At 504, the term auto-tagging system can identify a series of text portions in the document. Each text portion can include a text line detected in the document. In some instances, the document can be translated from a fixed format (e.g., PDF) to a machine-readable format (e.g., HTML). Further, each text portion can be translated into a vector representation in a multi-dimensional vector space. The text of each text portion can be obtained from the vector representation of each text portion.

At 506, each text portion identified in 504 can be processed. For instance, each text portion can be individually processed to tag terms in each text line as described herein.

At 508, the term auto-tagging system can identify a first set of terms in the document associated with a first tag by comparing each of the series of text portions with a database mapping terms with a plurality of tags. For example, each term in a text portion can be compared with a listing of terms in a database, where each term in the database is associated with one or more tags. As an example, the word "smoke" can be a term associated with a term related to smoking. As another example, a term relating to an object (e.g., an automobile) can be identified with a tag associated with objects.

In some embodiments, the identification of the first set of terms can identify all terms tagged with a first tag (e.g., terms identified as relating to expletive content). In such embodiments, the first set of terms can all comprise terms relating to expletive content.

As described above, each tag can uniquely specify a class of terms. Example tag classes can include expletive terms, terms identifying actions (e.g., violent actions, smoking, gambling), terms identifying objects, terms relating to audio or video content (e.g., music, movies, television shows), terms specifying locations, etc.

At 510, the term auto-tagging system can associate each of the first set of terms with the first tag. This can include generating a listing of all identified terms and tags assigned to each term. The tags associated with each term can be identified in a first visual representation as described below.

At 512, the term auto-tagging system can identify a second set of terms in the document associated with any of the plurality of tags maintained at the database using metadata maintained at the database. This can include performing a process to identify all terms associated with other tags as specified in the database. In some embodiments, a client can specify a portion of tags to search the document based on a type of document.

Each tag can be associated with metadata providing contextual features for terms. For example, the metadata can provide insights into a context for each term, such as specifying other text relating to each term or an action to take for each term. In a first instance, metadata can provide that the term "smoke" was included in a text line "I ate a smoked salmon salad," and an action was selected indicating that this instance of the term "smoke" is not to be tagged with a tag for smoking products. In another instance, metadata can provide that the term "smoke" was included in a text line "they were smoking a cigarette," and an action was selected indicating that this instance of the term "smoke" is to be tagged with a tag for smoking products. Such contextual features can be used by the term auto-tagging system to train the system and increase accuracy in tagging terms based on a context for the terms and corresponding tags.

At 514, the term auto-tagging system can associate each of the second set of terms with the one or more corresponding tags. In some instances, a term can be associated with multiple tags.

At 516, the term auto-tagging system can provide a first visual representation to a client device. For example, a first visual representation can identify each of the first set of terms and the second set of terms, each tag corresponding with each of the first set of terms and the second set of terms, and one or more actions for each of the identified terms. In some instances, the first visual representation of comprises a modification of the document to highlight to each identified term and adding an interface specifying tags corresponding with each term and the one or more actions associated with each term.

As an illustrative example, illustration 400B in FIG. 4B can specify an example of a first visual representation as described herein. As shown in FIG. 4B, for a text line (e.g., 404A), a term can be identified (e.g., identification 410A for term 1 406A). further, an interface 412A can indicate that the term is associated with tag 1 414A. Further, the interface 412A can include multiple actions capable of being selected, such as a first action (e.g., 416A specifying a selection to keep the indication 410A to the term 406A) or a second action (e.g., 416B specifying a selection to remove the indication 410A to the term 406A). The first visual representation can be provided to a client (e.g., via a client device).

At 518, the term auto-tagging system can generate a second visual representation that modifies the first visual representation according to the obtained selections of the one or more actions for any of the identified terms. The second visual representation can be generated responsive to obtaining selections of the one or more actions for any of the identified terms. For example, a client, via client device, can select one or more actions for any of the terms (e.g., to keep a term identified or to remove the identification of a term).

In some instances, in response to providing the first visual representation to the client device, a selection of an additional term in the document and one or more tags to be associated with the additional term can be selected. The additional term can include a term not previously included in the database, and the selection can specify a request to add the additional term to the database. The database can be updated by the term auto-tagging system to map the additional term to the one or more tags. The additional term and the one or more tags can be included in the second visual representation.

As an illustrative example, in FIG. 4C, a first action for a first term 406A at a first text line 404A can be selected (e.g., selection of action 416A to keep the identification 410A of term 1 406A). Responsive to this selection, the identification 410A can be included in the second visual representation. Further, in this example, at a third text line 404C, an action 416D to remove the identification 410B to term 2 406B can be selected. In response, the identification 410B to term 406B can be removed in the second visual representation.

At 520, the term auto-tagging system can provide metadata to the database. The metadata can provide contextual features used for training of the term auto-tagging system. The metadata can include the term, the one or more tags associated with the term, text for the text portion corresponding with the term, and an indication of any selection of any action for the term.

At 522, the term auto-tagging system can providing the second visual representation to the client device. The second visual representation can provide a modified version of the document identifying terms for further processing/review at the client device.

As an illustrative example, the display in FIG. 4D can illustrate an example second visual representation. The second visual representation can include identified terms (e.g., identification 410A to term 406A, identification 418 to an additional term) and corresponding interfaces 422A-B illustrating tag information (e.g., 414A, 416D).

V. Conclusion

The various embodiments can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   obtaining, at a term auto-tagging system, a document from a client device;
   identifying, by the term auto-tagging system, a series of text portions in the document;
   processing, by a machine learning model of the term auto-tagging system, each of the series of text portions to:
      identify a first set of terms in the document associated with a first tag of a plurality of tags by comparing each of the series of text portions with a database mapping terms with the plurality of tags, each tag uniquely specifying a class of terms;
      associate each of the first set of terms with the first tag of the plurality of tags;
      identify a second set of terms in the document associated with a second tag of the plurality of tags maintained at the database using metadata maintained at the database; and
      associate each term of the second set of terms with the one or more identified tags;
   providing, by the term auto-tagging system, a first visual representation to the client device, the first visual representation identifying each of the first set of terms and the second set of terms, each tag corresponding with each of the first set of terms and the second set of terms, and one or more actions for each of the first set of terms and the second set of terms;

responsive to obtaining selections of the one or more actions for any of the identified terms, generating, by the term auto-tagging system, a second visual representation that modifies the first visual representation according to the obtained selections of the one or more actions for any of the identified terms;

for each identified term, providing, by the term auto-tagging system to the database, new metadata for tags associated with each term, the new metadata comprising the term, the one or more tags associated with the term, text for the text portion corresponding with the term, and an indication of any selection of any action for the term; and responsive to obtaining the selections of the one or more actions for any of the identified terms, training the machine learning model using the new metadata; and providing the second visual representation to the client device.

2. The method of claim 1, wherein the first visual representation of comprises modifying the document to highlight to each identified term and adding an interface specifying tags corresponding with each term and the one or more actions associated with each term.

3. The method of claim 1, wherein the action is to remove a first term of the first set of terms, and wherein the generation of the second visual representation further comprises:

responsive obtaining the selection of the action, removing the identification of the first term and any tags associated with the first term from the second visual representation.

4. The method of claim 1, further comprising:
translating, by the term auto-tagging system, each text portion into a vector representation in a multi-dimensional vector space, wherein text for each text portion is obtained from the vector representation of each text portion.

5. The method of claim 1, further comprising:
training the term auto-tagging system using the metadata maintained at the database.

6. The method of claim 1, wherein any of the first visual representation and the second visual representation is provided to the client device via a web application executing on the client device.

7. The method of claim 1, further comprising:
in response to providing the first visual representation to the client device, detecting a selection of an additional term in the document and one or more tags to be associated with the additional term; and
updating the database to map the additional term to the one or more tags, wherein the additional term and the one or more tags is included in the second visual representation.

8. The method of claim 1, wherein the first tag of the plurality of tags identifies terms identified as comprising expletive content.

9. A term auto-tagging system, comprising:
a memory configured to store computer-executable instructions; and
a processor configured to connect to the memory and execute the computer-executable instructions to at least:
obtain a document from a client device;
identify a series of text portions in the document;
process, by a machine learning model of the term auto-tagging system, each of the series of text portions to:
identify a first set of terms in the document associated with one or more tags by comparing each of the series of text portions with a database mapping terms with the plurality of tags, each tag uniquely specifying a class of terms;
associate each of the first set of terms with corresponding tags;
provide a first visual representation to the client device, the first visual representation identifying each of the first set of terms, each tag corresponding with each of the terms, and one or more actions for each of the set of terms;
responsive to obtaining selections of the one or more actions for any of the identified terms, generate a second visual representation that modifies the first visual representation according to the obtained selections of the one or more actions for any of the identified terms;
for each identified term, provide new metadata to the database, the new metadata comprising any of the term, the one or more tags associated with the term, data for the text portion corresponding with the term, and an indication of any selection of any action for the term;
responsive to obtaining the selections of the one or more actions for any of the identified terms, train the machine learning model using the new metadata; and
providing the second visual representation to the client device.

10. The term auto-tagging system of claim 9, wherein the action is to remove a first term of the set of terms, and wherein the generation of the second visual representation further comprises:
responsive obtaining the selection of the action, removing the identification of the first term and any tags associated with the first term from the second visual representation.

11. The term auto-tagging system of claim 9, wherein the document is obtained by the client device via a web application executing on the client device.

12. The term auto-tagging system of claim 9, wherein identifying the series of text portions in the document further includes:
converting the document from a fixed format to a machine-readable format, wherein the series of text portions are identified by processing the document in the machine-readable format.

13. The term auto-tagging system of claim 9, wherein the processor is further configured to execute the computer-executable instructions to at least:
generate a report listing all identified terms in the document and the tags corresponding with each of the terms according to the obtained selection of the action of the one or more actions for any of the terms.

14. A method performed by a term auto-tagging system to identify terms in a document as associated with one or more tags, the method comprising:
identifying a series of text portions in a document obtained from a client device;
processing, by a machine learning model of the term auto-tagging system, each of the series of text portions to:
identify a first set of terms in the document associated with a first tag of a plurality of tags by comparing each of the series of text portions with a database mapping terms with the plurality of tags, each tag uniquely specifying a class of terms;

associate, by the term auto-tagging system, each of the first set of terms with the first tag of the plurality of tags;

identify a second set of terms in the document associated with a second tag of the plurality of tags maintained at the database using metadata maintained at the database; and associate each of the second set of terms with;

providing a first visual representation to the client device identifying each of the first set of terms and the second set of terms and tags corresponding with each of the first set of terms;

responsive to obtaining selections of the one or more actions for any of the identified terms, generating a second visual representation modifying the first visual representation according to the obtained selections of the one or more actions for any of the identified terms;

for each identified term, provide new metadata to the database, the new metadata comprising any of the term, the one or more tags associated with the term, data for the text portion corresponding with the term, and an indication of any selection of any action for the term;

responsive to obtaining the selections of the one or more actions for any of the identified terms, train the machine learning model using the new metadata; and providing the second visual representation to the client device.

15. The method of claim 14, further comprising:

for each identified term, providing, to the database, new metadata for tags associated with each term, the new metadata comprising the term, the one or more tags associated with the term, text for the text portion corresponding with the term, and an indication of any selection of any action for the term.

16. The method of claim 14, further comprising:

identifying a rating score assigned to the document, wherein the plurality of tags comprise only tags that are associated with the rating score.

17. The method of claim 14, wherein the first visual representation of comprises modifying the document to highlight to each identified term and adding an interface specifying tags corresponding with each term and the one or more actions associated with each term.

18. The method of claim 14, wherein the action is to remove a first term of the first set of terms, and wherein the generation of the second visual representation further comprises:

responsive obtaining the selection of the action, removing the identification of the first term and any tags associated with the first term from the second visual representation.

19. The term auto-tagging system of claim 9, translate each text portion into a vector representation in a multi-dimensional vector space, wherein text for each text portion is obtained from the vector representation of each text portion.

* * * * *

UNITED STATES PATENT AND TRADEMARK OFFICE
CERTIFICATE OF CORRECTION

PATENT NO. : 11,977,573 B2  
APPLICATION NO. : 17/558374  
DATED : May 7, 2024  
INVENTOR(S) : Nirali K. Sanghvi et al.

Page 1 of 1

It is certified that error appears in the above-identified patent and that said Letters Patent is hereby corrected as shown below:

In the Claims

Column 16, Claim 1, Lines 52-53, delete "with a database mapping terms" and insert --with a database of mapping terms--

Column 17, Claim 2, Lines 22-23, delete "wherein the first visual representation of comprises modifying the document" and insert --wherein the first visual representation comprises a modification of the document--

Column 18, Claim 9, Lines 6-7, delete "with a database mapping terms" and insert --with a database of mapping terms--

Column 19, Claim 14, Lines 1-2, delete "with a database mapping terms" and insert --with a database of mapping terms--

Column 20, Claim 17, Lines 12-13, delete "wherein the first visual representation of comprises modifying the document" and insert --wherein the first visual representation comprises a modification of the document--

Signed and Sealed this  
Twenty-fifth Day of June, 2024

Katherine Kelly Vidal  
*Director of the United States Patent and Trademark Office*